No. 633,412. Patented Sept. 19, 1899.
E. B. ATKINS.
PERCOLATOR.
(Application filed Dec. 23, 1898.)
(No Model.)
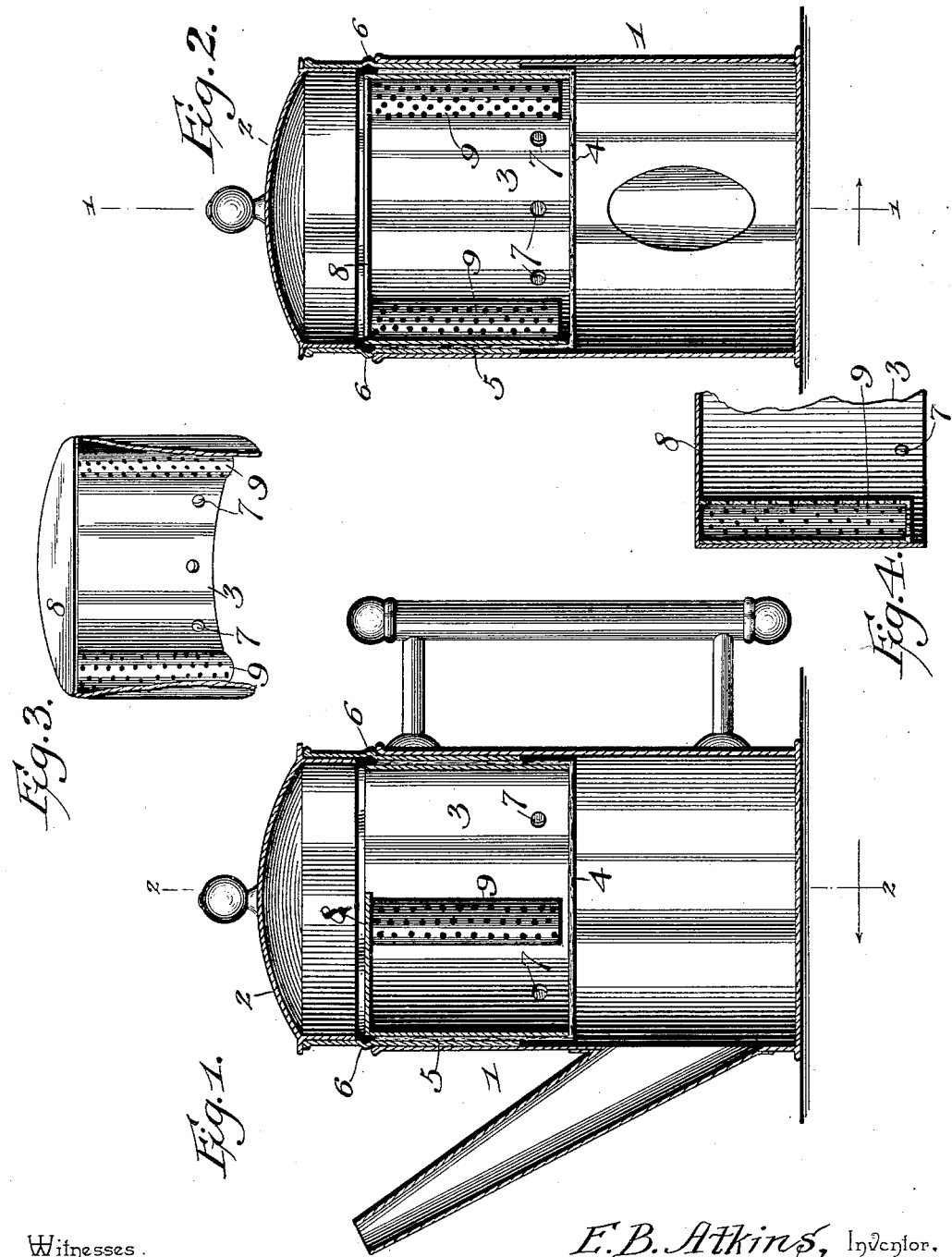
Witnesses. E. B. Atkins, Inventor.
By his Attorneys,

UNITED STATES PATENT OFFICE.

EDWARD B. ATKINS, OF PARIS, TENNESSEE.

PERCOLATOR.

SPECIFICATION forming part of Letters Patent No. 633,412, dated September 19, 1899.

Application filed December 23, 1898. Serial No. 700,153. (No model.)

*To all whom it may concern:*

Be it known that I, EDWARD B. ATKINS, a citizen of the United States, residing at Paris, in the county of Henry and State of Tennessee, have invented a new and useful Percolator, of which the following is a specification.

This invention relates to tea and coffee pots, and more particularly to percolators for use in connection therewith.

The object of the invention is to provide improved means for distributing or diffusing the steam from the liquid contents of the pot through the coffee or tea, to separate and deposit the essential qualities or properties thereof into the liquid, and avoid the loss of the aroma arising therefrom, and is accomplished by distributing the steam at intervals throughout the material in the percolator.

To this end the invention consists in the combination and arrangement of parts, as will be hereinafter more fully described, and particularly pointed out in the claims.

In the drawings, Figure 1 is a longitudinal sectional view of a tea or coffee pot having the improved percolator. Fig. 2 is a sectional view at right angles to Fig. 1. Fig. 3 is a detail perspective view of the filter-tube, a part being broken away to show the interior thereof. Fig. 4 is a detail sectional view taken longitudinally through the steam tubes or passages.

Corresponding parts are designated by like reference characters in all the figures of the drawings.

Referring to the accompanying drawings, 1 designates an ordinary tea or coffee pot having the usual cover or lid 2.

The percolator comprises a tubular body 3, having a cloth or suitable material 4 stretched over the bottom thereof and extending upward and embracing the outer walls of the tube to form a filter or strainer. A clamping-band 5 receives the body and the filtering material, the latter being tightly clamped between the walls of the body and the clamping-band, whereby the material is connected with the body, and the latter is suspended within the band. The band is provided with an outer annular bead 6, which is adapted to engage the upper edge of the pot and suspend the band within the body thereof, as plainly illustrated in both Figs. 1 and 2.

The tubular body is provided with an annular series of openings 7 near the lower end, and a half-cover or segmental plate 8 partly closes the upper end thereof. A pair of tubes or passages 9 are provided within the tubular body, being disposed approximately diametrically opposite each other and depending from the half-cover or plate 8, to which they are secured by soldering or in any preferred manner. These tubes are arranged flush with the inner wall of the body of the percolator and are secured thereto, so as to support the same firmly against being misplaced. Each tube is formed of perforate metal, as shown, or of strong meshed fabric, being closed at its top, but having a perforate bottom.

In the operation of the device the tubular body, the filtering-cloth, and clamping-band are assembled, as heretofore described, and the percolator thus formed is suspended within the body of the pot by means of the annular bead formed on the clamping-band. Tea or finely-ground coffee is placed within the tubular body, boiling water is poured thereover, the cover then being tightly fitted to the top of the clamping-band, and the material is allowed to steep. The percolator is preferably arranged with the segmental plate 8 disposed next to the spout side of the pot, as shown in Fig. 1, so as to act as a shield to prevent the coffee or tea grounds from spilling out into the cover when the pot is tipped to pour out the liquid. The boiling water intermingles with the tea or coffee and passes through the filtering-cloth at the bottom of the filtering-tube and through the openings 7 into the body of the pot. It will be understood that the tea or coffee material surrounds the perforate tubes 9, but has no access to the interior thereof, and as the steam arises from the water within the pot it passes upward through the tubes, escaping through the perforations thereof and permeates throughout the entire body of the tea or coffee to separate the essential qualities or properties thereof and carry the same to the liquid below the percolator in the form of condensed moisture. The steam will more readily rise into the tubes than through the large body of closely-packed saturated tea or coffee, and will thereby be more effectively diffused through the same.

The size of the steam distributing or diffusing tubes or pipes may be varied and the number and disposition thereof may be changed, as desired, so long as the steam diffusing or distributing feature is preserved; but the pipes should be perforated throughout their entire length or at least at intervals thereof, so that the steam may be distributed at several different points within the body of the tea or coffee to produce the maximum effect of separating the essential qualities of the same and depositing them, as heretofore described.

It will be noted that the segmental plate 8 besides acting as a shield, as described, also serves as a support for the steam tubes or pipes 9 and forms a cover for the tops thereof to prevent the tea or coffee from entering therein.

Having thus fully described the invention, what is claimed is—

1. A percolator, comprising a tubular body having a filter or strainer at its lower end, and a steam-distributing passage or passages arranged to convey the steam from the liquid contents of a pot and diffuse the same through the tea or coffee grounds, at intervals throughout the length of each passage, substantially as and for the purpose set forth.

2. In a percolator, the combination with a tubular body having a filter or strainer at its lower end, and a segmental plate at its upper end, of tubes or pipes perforated throughout their entire length and at the bottom, and suspended from the segmental plate within the tubular body, the plate forming a closure for the tops of the perforate tubes or pipes, substantially as and for the purpose set forth.

3. In a percolator, the combination with a hollow body having a filter or strainer at its bottom, a plate partially closing the top of the body, and tubes perforated throughout and arranged within the body between the plate and the strainer, said tubes being open at the bottom and closed at the top, substantially as specified.

In testimony that I claim the foregoing as my own I have hereto affixed my signature in the presence of two witnesses.

EDWARD B. ATKINS.

Witnesses:
JOS. WEINBANN,
T. M. BROWN.